US011736330B2

(12) United States Patent
Lin et al.

(10) Patent No.: US 11,736,330 B2
(45) Date of Patent: Aug. 22, 2023

(54) INDICATION OF SUBCARRIER SPACING NUMEROLOGY

(71) Applicant: Telefonaktiebolaget LM Ericsson (publ), Stockholm (SE)

(72) Inventors: Zhipeng Lin, Nanjing Jiangsu (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/521,531

(22) Filed: Nov. 8, 2021

(65) Prior Publication Data

US 2022/0070043 A1 Mar. 3, 2022

Related U.S. Application Data

(63) Continuation of application No. 16/318,325, filed as application No. PCT/CN2018/112382 on Oct. 29, 2018, now Pat. No. 11,233,689.

(30) Foreign Application Priority Data

Oct. 31, 2017 (WO) ................ PCT/CN2017/108639

(51) Int. Cl.
*H04L 27/26* (2006.01)
*H04W 36/00* (2009.01)
*H04W 36/08* (2009.01)
*H04W 48/10* (2009.01)

(52) U.S. Cl.
CPC ..... *H04L 27/2666* (2013.01); *H04W 36/0077* (2013.01); *H04W 36/08* (2013.01); *H04W 48/10* (2013.01)

(58) Field of Classification Search
CPC .......... H04L 27/2666; H04W 36/0077; H04W 36/08; H04W 48/10
See application file for complete search history.

(56) References Cited

U.S. PATENT DOCUMENTS 9,264,165 B2 2/2016 Kwon et al.
10,812,238 B2 * 10/2020 Zhang .................. H04B 7/0456
2013/0016649 A1 1/2013 Damnjanovic et al.
(Continued)

FOREIGN PATENT DOCUMENTS

CN 101018225 A 8/2007
CN 101299742 A 11/2008
(Continued)

OTHER PUBLICATIONS

Huawei, et al., "Bandwidth adaptation and scalable design in NR", 3GPP TSG RAN WG1 Meeting #88, R1-1701644, Athens, Greece, Feb. 13-17, 2017, 1-5.

(Continued)

*Primary Examiner* — Natasha W Cosme
(74) *Attorney, Agent, or Firm* — Murphy, Bilak & Homiller, PLLC

(57) ABSTRACT

A method for communications is proposed. The method may comprise receiving a signaling message from a network node. The signaling message may indicate a subcarrier spacing numerology for a synchronization signal transmission. The method may further comprise determining the subcarrier spacing numerology, based at least in part on the signaling message.

16 Claims, 10 Drawing Sheets

300

Receive a signaling message from a network node, where the signaling message indicates a SCS numerology for a SS transmission (302)

Determine the SCS numerology, based at least in part on the signaling message (304)

(56) References Cited

U.S. PATENT DOCUMENTS

| | | | | |
|---|---|---|---|---|
| 2015/0056931 | A1 | 2/2015 | Yerramalli et al. | |
| 2015/0207549 | A1 * | 7/2015 | Nagata | H04W 24/10 370/252 |
| 2017/0034741 | A1 | 2/2017 | Hahn et al. | |
| 2017/0094547 | A1 | 3/2017 | Yum et al. | |
| 2017/0105112 | A1 | 4/2017 | Park et al. | |
| 2017/0245165 | A1 | 8/2017 | Onggosanusi et al. | |
| 2019/0037551 | A1 | 1/2019 | Cheng | |
| 2019/0313271 | A1 | 10/2019 | Yiu | |

FOREIGN PATENT DOCUMENTS

| | | | |
|---|---|---|---|
| CN | 101467373 | A | 6/2009 |
| CN | 105103261 | A | 11/2015 |
| CN | 106376050 | A | 2/2017 |
| RU | 2460226 | C2 | 8/2012 |
| RU | 2529554 | C2 | 9/2014 |
| WO | 2017062061 | A1 | 4/2017 |
| WO | 2017131065 | A1 | 8/2017 |
| WO | 2017135020 | A1 | 8/2017 |
| WO | 2017135213 | A1 | 8/2017 |
| WO | 2017138985 | A1 | 8/2017 |
| WO | 2017184865 | A1 | 10/2017 |

OTHER PUBLICATIONS

Mediatek Inc., “On the alignment of OFDM symbol boundary”, 3GPP TSG RAN WG1 Meeting #8, R1-167528, Gothenburg, Sweden, Aug. 22-26, 2016, 1-4.

Motorola Mobility, et al., “Numerology and structure for NR synchronization signal”, 3GPP TSG RAN WG1 Meeting #88, R1-1703043, Athens, Greece, Feb. 13-17, 2017, 1-6.

Zte, et al., “Support of Multiple CP Families for NR”, 3GPP TSG-RAN WG1 Meeting #86b, R1-1608962, Lisbon, Portugal, Oct. 10-14, 2016, 1-11.

3GPP, “3GPP TS 36.331 V14.4.0”, 3rd Generation Partnership Project; Technical Specification Group Radio Access Network; Evolved Universal Terrestrial Radio Access (E-UTRA); Radio Resource Control (RRC); Protocol Specification (Release 14), section 5.5.1, Sep. 2017, pp. 134-136.

Huawei, et al., “Events and measurements for handover from E-UTRA to NR”, 3GPP TSG-RAN WG2#99bis, R2-1711069, (revision of R2-1708699), Prague, Czech Republic, Oct. 9-13, 2017, 1-3.

Unknown, Author, “Consideration on measurement gap in NR”, 3GPP TSG-RAN WG2 Meeting 099bis, R2-1710937, Prague, Czech Republic, Oct. 9-13, 2017, pp. 1-4.

Unknown, Author, “Discussion on requirement of measurement in E-UTRAN”, 3GPP TSG RAN WG2#NR_99bis; R2-1710436; (revision of R2-1708121); Prague, Czech, Oct. 9-13, 2017, pp. 1-4.

Unknown, Author, “Intra and inter frequency measurement definition in multiple reference signal transmission scenario”, 3GPP TSG-RAN WG4 Meeting NR#3, R4-1709626, Nagoya, Japan, Sep. 18-21, 2017, pp. 1-5.

Unknown, Author, “Introducing support for NR”, 3GPP TSG-RAN2 WG2 Meeting #99, R2-1709488, Berlin, Germany, Aug. 21-25, 2017, 1-329.

Unknown, Author, “RAN1 Chairman’s Notes”, 3GPP TSG RAN WG1 Meeting #88, Athens, Greece, Feb. 13-17, 2017, 1-109.

Unknown, Author, “RAN1 Chairman’s Notes”, 3GPP TSG RAN WG1 Meeting #90, Prague, Czech Republic, Aug. 21-25, 2017, 1-143.

Unknown, Author, “RAN1 Chairman’s Notes”, 3GPP TSG RAN WG1 Meeting 90bis, Prague, CZ, Oct. 9-13, 2017, 1-143.

Unknown, Author, “Remaining details on L3 measurement and mobility management”, 3GPP TSG RAN WG1 Meeting #90bis; R1-1717932; Prague, Czech Republic, Oct. 9-13, 2017, pp. 1-12.

Unknown, Author, “Text Proposal for L1 parameters for 38.331”, 3GPP TSG-RAN WG2 #9bis; Tdoc R2-1711969; Prague, Czech Republic, Oct. 9-13, 2017, pp. 1-26.

Vivo, “Measurement configuration for measurement object”, 3GPP TSG-RAN WG2 Meeting #99bis, R2-1710935, Prague, Czech Republic, Oct. 9-13, 2017, 1-3.

* cited by examiner

INDICATION OF SUBCARRIER SPACING NUMEROLOGY

FIELD OF THE INVENTION

The present disclosure generally relates to communication networks, and more specifically, to a subcarrier spacing numerology in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, a terminal device may be connected to different wireless communication networks, such as a long term evolution (LTE)/fourth generation (4G) network or a new radio (NR)/fifth generation (5G) network, to obtain multiple types of services. In order to connect to a network, a terminal device may need to acquire network synchronization and obtain essential system information (SI). For example, a terminal device may need to do frequency sweeping for an initial access based on primary synchronization signal (PSS) sequences in different supported frequency bands. However, more than one subcarrier spacing (SCS) numerology might be applied at the same time for the synchronization signal transmission, which may increase the complexity of detecting synchronization signals for the terminal device. Thus, it may be desirable to improve the synchronization signal detection in a more efficient way.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as a NR/5G network may be able to support flexible network configuration and channel bandwidth. Different SCS numerologies or values may be deployed for a synchronization signal and physical broadcast channel block (which is also known as a SS/PBCH block or a SSB for short). When one or more SCS numerologies might be applied at the same time for different frequency bands, a terminal device may have to try more than one SCS for a SSB when accessing a NR cell. Therefore, there may be a need to implement the detection of the SSB more efficiently.

The present disclosure proposes a solution for indicating a SCS numerology of a SS transmission, which can enable a terminal device to detect the SS transmission via only one SCS per band without trying more than one SCS, for example, when accessing a NR cell.

According to a first aspect of the present disclosure, there is provided a method implemented at a terminal device such as user equipment (UE). The method may comprise receiving a signaling message from a network node. The signaling message may indicate a SCS numerology for a SS transmission. The method may further comprise determining the SCS numerology, based at least in part on the signaling message.

In accordance with an exemplary embodiment, the method according to the first aspect of the present disclosure may further comprise detecting the SS transmission according to the determined SCS numerology.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise a receiving unit and a determining unit. In accordance with some exemplary embodiments, the receiving unit may be operable to carry out at least the receiving step of the method according to the first aspect of the present disclosure. The determining unit may be operable to carry out at least the determining step of the method according to the first aspect of the present disclosure.

According to a fifth aspect of the present disclosure, there is provided a method implemented at a network node such as a base station. The method may comprise determining a signaling message which may indicates a SCS numerology for a SS transmission. The method may further comprise transmitting the signaling message to a terminal device.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a determining unit and a transmitting unit. In accordance with some exemplary embodiments, the determining unit may be operable to carry out at least the determining step of the method according to the fifth aspect of the present disclosure. The transmitting unit may be operable to carry out at least the transmitting step of the method according to the fifth aspect of the present disclosure.

In accordance with an exemplary embodiment, the signaling message may comprise a broadcast signaling message. Optionally, the signaling message may comprise an information element associated with cell reselection.

In accordance with an exemplary embodiment, the signaling message may comprise a dedicated signaling message for the terminal device. Optionally, the signaling message may comprise an information element associated with frequency measurement.

In accordance with an exemplary embodiment, the signaling message may comprise an indicator for indicating the SCS numerology for the SS transmission in a specified frequency band.

In accordance with an exemplary embodiment, the SCS may be applicable for a new radio carrier. Optionally, the SCS numerology may be adaptive to a network configuration related to the terminal device.

In accordance with an exemplary embodiment, the signaling message may be a radio resource control (RRC) connection reconfiguration message.

In accordance with an exemplary embodiment, the signaling message may comprise a MeasObjectNR information element that indicates the SCS numerology for the SS transmission.

According to a ninth aspect of the present disclosure, there is provided a communication system. The communication system may include a host computer comprising a processing circuitry configured to provide user data and a communication interface configured to forward user data to a cellular network for transmission to a user equipment (UE). The UE may comprise a radio interface and a processing circuitry. The UE's processing circuitry may be configured to cause the UE at least to perform any step of the method according to the first aspect of the present disclosure.

In accordance with an exemplary embodiment, the cellular network may comprise a base station having a radio interface and processing circuitry. The base station's processing circuitry may be configured to cause the base station at least to perform any step of the method according to the fifth aspect of the present disclosure.

In accordance with an exemplary embodiment, the communication system according to the ninth aspect of the present disclosure may further include the UE. The cellular network may further include the base station configured to communicate with the UE.

In accordance with an exemplary embodiment, the processing circuitry of the host computer may be configured to execute a host application, thereby providing the user data. The UE's processing circuitry may be configured to execute a client application associated with the host application.

According to a tenth aspect of the present disclosure, there is provided a communication system. The communication system may include a communication interface configured to receive user data originating from a transmission from a UE to a base station. The UE may comprise a radio interface and a processing circuitry. The UE's processing circuitry may be configured to cause the UE at least to perform any step of the method according to the first aspect of the present disclosure.

In accordance with an exemplary embodiment, the communication system according to the tenth aspect of the present disclosure may further include the UE which is configured to communicate with the base station. The communication system may further include the base station which comprises a radio interface configured to communicate with the UE and a communication interface configured to forward to the host computer the user data carried by a transmission from the UE to the base station.

In accordance with an exemplary embodiment, the base station may comprise a processing circuitry which is configured to cause the base station at least to perform any step of the method according to the fifth aspect of the present disclosure.

In accordance with an exemplary embodiment, the processing circuitry of the host computer may be configured to execute a host application. The UE's processing circuitry may be configured to execute a client application associated with the host application, thereby providing the user data to be received by the host computer.

In accordance with an exemplary embodiment, the processing circuitry of the host computer may be configured to execute a host application, thereby providing request data. The UE's processing circuitry may be configured to execute a client application associated with the host application, thereby providing the user data in response to the request data.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
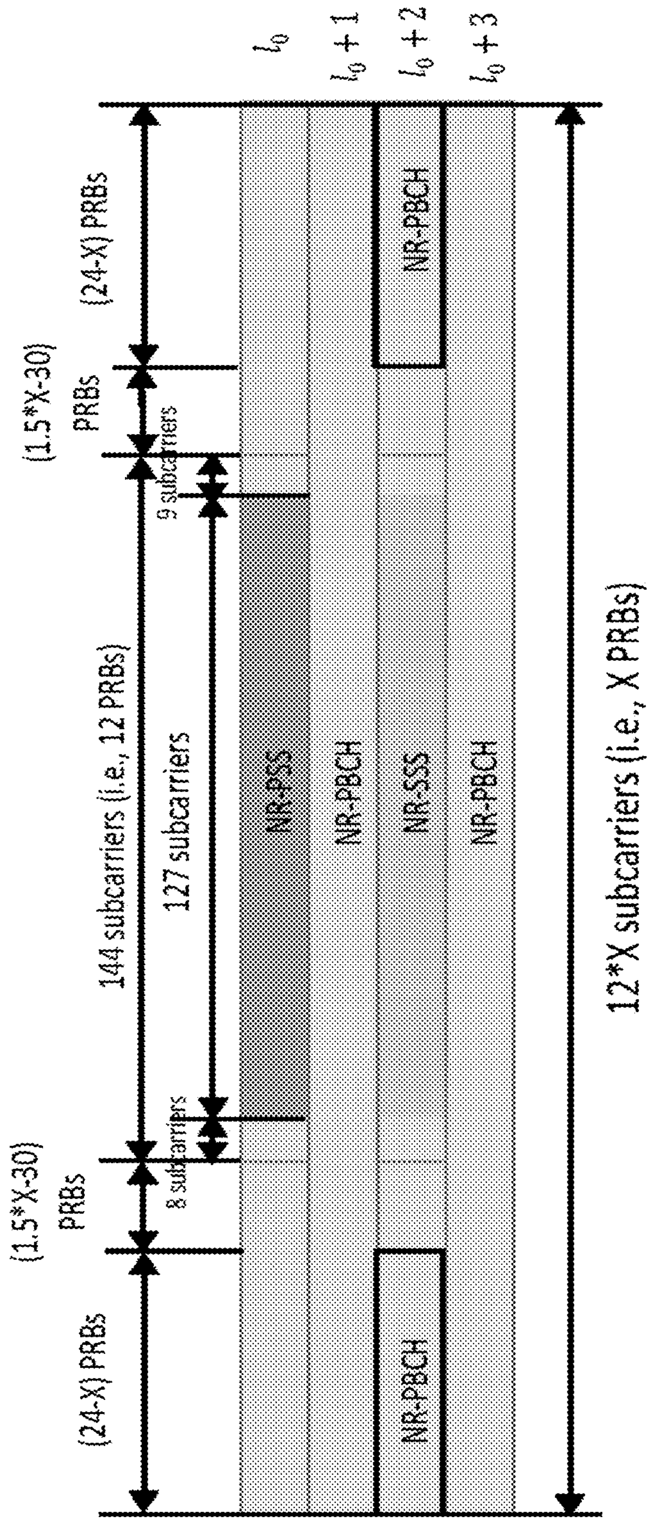
FIG. 1 is a diagram illustrating an exemplary SSB structure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless communication network" refers to a network following any suitable communication standards, such as NR, LTE-Advanced, LTE, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a wireless communication network via which a terminal device accesses to the network and receives services therefrom. The network node may refer to a base station (BS), an access point (AP), multi-cell/multicast coordination entity (MCE), a gateway, a server, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a wireless communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of things (IoT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring and/or reporting on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described previously, in order to connect to a wireless communication network, a terminal device may need to acquire network synchronization and obtain essential SI. Synchronization signals may be used for adjusting the frequency of the terminal device relative the network, and for finding the proper timing of the received signal from the network. In a wireless communication network such as NR, the synchronization and access procedure may involve several signals, for example, a primary synchronization signal (PSS), a secondary synchronization signal (SSS) and a physical broadcast channel (PBCH).

The PSS may allow for network detection in the presence of a high initial frequency error, for example, up to tens of ppm. Additionally, the PSS may provide a network timing reference. For example, Zadoff-Chu sequences may be selected as PSS signals in LTE and m-sequences may be selected as PSS signals in NR. The SSS may allow for more accurate frequency adjustments and channel estimation while at the same time providing fundamental network information, such as a cell identifier (ID). The PBCH may provide a subset of the minimum system information (SI) for random access. It also may provide timing information within a cell, for example, to separate timing between beams transmitted from a cell. The amount of information to fit into the PBCH is of course highly limited to keep the size down.

Furthermore, demodulation reference signals (DM-RS) may be interleaved with PBCH resources in order to receive the PBCH properly. A SS/PBCH block or SSB as proposed for NR may comprise the above signals such as PSS, SSS and the related DM-RS. It could be realized that the PBCH may be a part of the SSB.

FIG. 1 is a diagram illustrating an exemplary SSB structure according to an embodiment of the present disclosure. As illustrated in FIG. 1, four orthogonal frequency division multiplexing (OFDM) symbols are reserved for the exemplary SSB, which are denoted as "$l_0$", "$l_0+1$", "$l_0+2$" and "$l_0+3$" in FIG. 1, respectively. A SSB transmission may comprise NR-PSS, NR-SSS and NR-PBCH transmissions. In an exemplary embodiment, the NR-PSS transmission may be defined in 127 subcarriers wide whereas the whole SS transmission may be supposed to be in 240 subcarriers wide. FIG. 1 also shows that (24−X) physical resource blocks (PRBs) may be used for the NR-PBCH transmission, where 1 PRB corresponds to 12 subcarriers and X may be assumed to be 20 PRBs or any other suitable values.

Figure 2:
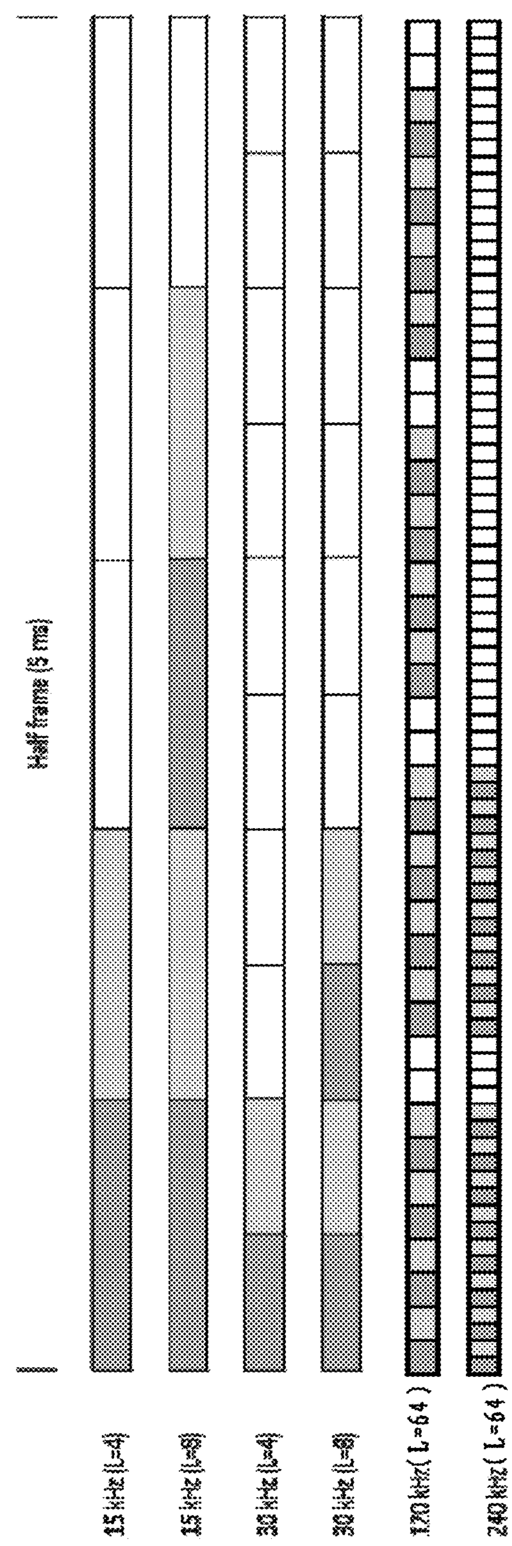
FIG. 2 is a diagram illustrating an exemplary SS burst set transmission according to an embodiment of the present disclosure.

FIG. 2 is a diagram illustrating an exemplary SS burst set transmission according to an embodiment of the present disclosure. According to the exemplary embodiment, a number of (typically rather close in time) SSBs may constitute a SS burst set. As illustrated in FIG. 2, for a SCS of 15 kHz with L=4 (where L is the maximum number of SSBs in a SS burst set), the first two slots may be used to transmit SSBs (for example, each slot for two SSBs), while the remaining three slots may not be used for SSB transmissions. Similarly, for a SCS of 15 kHz with L=8, the first four slots may be used to transmit SSBs (for example, each slot for two SSBs), while the last slot may not be used for SSB transmissions. FIG. 2 also shows similar SS burst set transmissions for the cases of 30 kHz, 120 kHz and 240 kHz SCSs.

According to an exemplary embodiment, a SS burst set may be transmitted periodically. By using the SSBs in the SS burst set, a UE can determine the downlink timing, frequency offset and/or the like, and acquire some fundamental system information from the PBCH. A NR UE in the idle mode may be configured to expect a SS burst set transmitted once per 20 ms. For an NR UE in the connected mode, it may be configured to expect a SS burst set transmitted as frequently as once per 5 ms. When the UE has obtained downlink synchronization, it may know in which slots to expect SSB transmissions. Thus, the location of the SSB in a SS burst set may need to be provided to the UE to derive the subframe level synchronization.

As illustrated in FIG. 2, other possible SCS numerologies or values, for example, the 30 kHz SCS, the 120 kHz SCS and the 240 kHz SCS, also may be applicable to SSB transmissions. The term "numerology" may be used to refer to some parameters related to the radio resources for signal transmissions, such as the SCS, the length or duration of a cyclic prefix (CP), the length or duration of an OFDM symbol, the number of symbols contained in a time slot, the time slot duration and/or the like.

In accordance with an exemplary embodiment, a parameter set (which may comprise some default parameters related with a SCS, a sequence length, a NR-SS transmission bandwidth, etc.) may be associated with a specific SCS numerology and possible maximum transmission bandwidth for NR-PBCH design. For example, a first parameter set may be associated with the 15 kHz SCS and the NR-PBCH transmission bandwidth no larger than 5 MHz, a second parameter set may be associated with the 30 kHz SCS and the NR-PBCH transmission bandwidth no larger than 10 MHz, a third parameter set may be associated with the 120 kHz SCS and the NR-PBCH transmission bandwidth no larger than 40 MHz, and the fourth parameter set may be associated with the 240 kHz SCS and the NR-PBCH transmission bandwidth no larger than 80 MHz.

For an initial access, a UE may need to do frequency sweeping based on PSS sequences in different supported frequency bands. On the other hand, one or more SCS numerologies might be applied at the same time for different frequency bands. In accordance with an exemplary embodiment, a wireless communication network such as NR may support network adaptation and indication of a SCS numerology used for a SSB, for example, for non-standalone (NSA) carrier access. A NSA carrier is the carrier that a UE cannot access without network assistance information, for example, from a LTE network.

In case that the target NSA carrier is in below 6 GHz range, the network may adapt or select a 15 kHz or 30 kHz SCS for a SS transmission. In case that the target NSA carrier is in above 6 GHz (for example, between 6 GHz and 52.6 GHz) range, the network may adapt or select a 120 kHz or 240 kHz SCS for a SS transmission. According to an exemplary embodiment, the network can indicate the selected SCS for the SS transmission to the UE. If there is no indication of the SCS numerology used for the SS transmission on the target NSA carrier, the UE can assume a default SCS numerology for the SS transmission per frequency carrier.

Similar to the NSA scenario, one or more SCS numerologies per frequency band also may be possible in the standalone (SA) scenario, for example, for some bands such as band 5 and band 66. If a UE always needs to try more than one SCS when accessing a NR cell, the operation complexity of the UE may be quite high. The power consumption and the time required to access a NR cell for the UE also may be increased. In order to enable the UE to find a single SCS per frequency band, it may be benefit that the network side could deliver information of the SCS numerology used for the SS transmission to the UE.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 3:
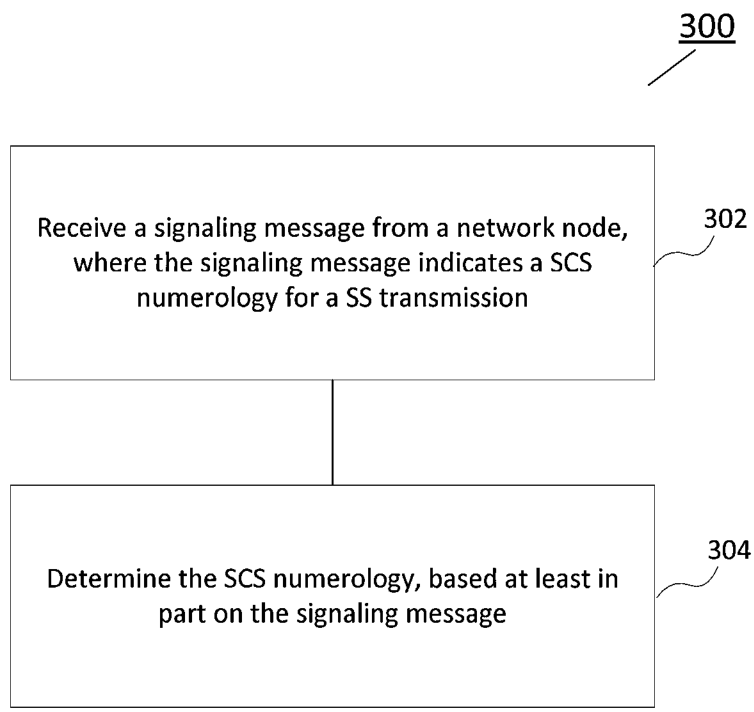
FIG. 3 is a flowchart illustrating a method according to some embodiments of the present disclosure.

FIG. 3 is a flowchart illustrating a method 300 according to some embodiments of the present disclosure. The method 300 illustrated in FIG. 3 may be performed by an apparatus implemented in a terminal device or communicatively coupled to a terminal device. In accordance with the exemplary embodiment, the terminal device may comprise a UE, a mobile station, a wireless device, a PDA, a laptop computer, a tablet computer, a smart phone, a portable device, a MTC device, or any other user device being capable of participating in communication of a wireless network.

According to the exemplary method 300 illustrated in FIG. 3, the terminal device may receive a signaling message from a network node such as an eNB or a gNB, as shown in block 302. For example, the signaling message may indicate a SCS numerology for a SS transmission. In accordance with an exemplary embodiment, the SCS numerology may be applicable for a NR carrier. Based at least in part on the signaling message, the terminal device can determine the SCS numerology, as shown in block 304.

In accordance with an exemplary embodiment, the signaling message may comprise a broadcast signaling message. For example, the broadcast signaling message may comprise a radio resource control (RRC) broadcast signaling from the network node. Optionally, the signaling message may comprise an information element associated with cell reselection, such as a LTE system information block type 2N (SIB 2N) information element for inter-radio access technologies (inter-RAT) cell reselection to NR.

Alternatively, the signaling message may comprise a dedicated signaling message for the terminal device. For example, dedicated signaling message may comprise a RRC dedicated signaling from the network node. Optionally, the signaling message may comprise an information element associated with frequency measurement, such as a LTE measurement object NR (MeasObjectNR) information element in a RRC connection reconfiguration message.

In accordance with an exemplary embodiment, the signaling message may comprise an indicator for indicating the SCS numerology for the SS transmission in a specified frequency band, for example, in a band below 6 GHz or above 6 GHz. The indicator of the SCS numerology may be one or more newly defined bits, reserved bits or reused bits in the signaling message. Different values of the indicator may be used to indicate different SCS numerologies.

In an exemplary embodiment for the NSA scenario, an indicator may be defined to indicate the SCS numerology in a RRC broadcast signaling such as a RRC LTE SIB 2N for inter-RAT cell reselection to NR. Alternatively, an indicator may be defined to indicate the SCS numerology in a RRC dedicated signaling such as a LTE MeasObjectNR in a RRC connection reconfiguration message, for example, when a LTE eNB ask a UE to measure a NR frequency.

In an exemplary embodiment for the SA scenario, an indicator may be defined to indicate the SCS numerology in a RRC dedicated signaling for a SA non-initial access of a UE. For example, the indicator of the SCS numerology may be added in a MeasObjectNR information element of a RRC connection reconfiguration message by a gNB serving the UE, so that the UE can know the SCS numerology for the SS transmission on the frequency that the gNB wants the UE to measure. For a SA initial access, the UE may blindly detect more than one SCS. For example, the UE may try to detect both 15 kHz SCS and 30 kHz SCS for a band below 6 GHz, or both 120 kHz and 240 kHz for a band above 6 GHz.

In accordance with an exemplary embodiment, the terminal device as described in connection with FIG. 3 may detect the SS transmission according to the determined SCS numerology. It will be realized that the terminal device may use a default SCS numerology if there is no signaling message broadcasted or no dedicated signaling message received from the network node.

It can be seen that the proposed solution can support to indicate a single SCS numerology for a SS transmission in a scenario where more than one SCS numerology may be applicable for the SS transmission. Therefore, the terminal device such as a UE may be able to detect a NR cell via only one SCS per band. In this way, the operation complexity of the UE may be reduced. In addition, the power consumption and the time required to access a NR cell may be saved for the UE.

Figure 4:
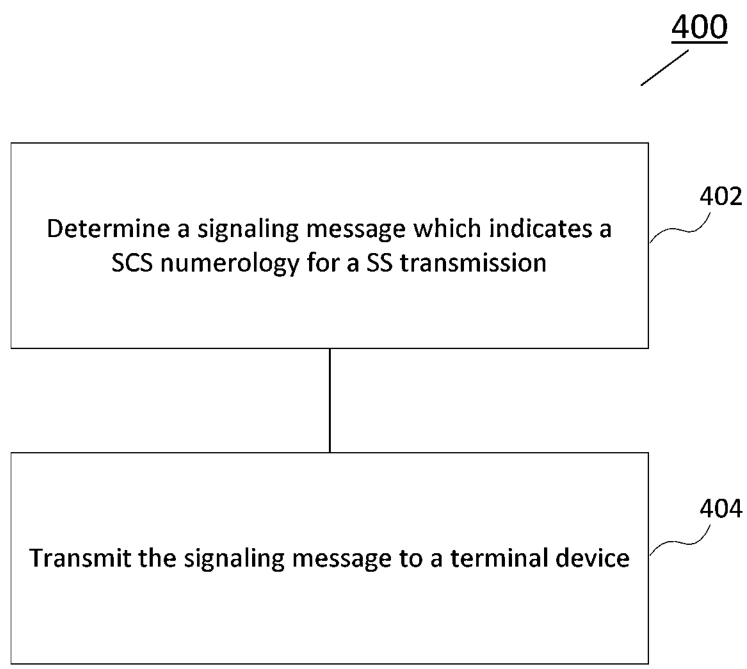
FIG. 4 is a flowchart illustrating another method according to some embodiments of the present disclosure.

FIG. 4 is a flowchart illustrating a method 400 according to some embodiments of the present disclosure. The method 400 illustrated in FIG. 4 may be performed by an apparatus implemented in a network node or communicatively coupled to a network node. In accordance with the exemplary embodiment, the network node may comprise an eNB, a gNB or any other network device being capable of participating in communication of a wireless network.

Corresponding to operations of the exemplary method 300 as illustrated in FIG. 3, the network node in the exemplary method 400 may determine a signaling message which indicates a SCS numerology for a SS transmission, as shown in block 402. Then the network node may transmit the signaling message to a terminal device as described in connection with FIG. 3. As mentioned previously, an indicator may be contained in the signaling message for indicating the SCS numerology for the SS transmission in a specified frequency band. The indicated SCS numerology may be applicable for a NR carrier.

In accordance with an exemplary embodiment, the SCS numerology may be adaptive to a network configuration related to the terminal device. For example, a larger SCS may be specified or configured for higher speed cases. As such, the wireless network may be able to flexibly adapt different SCS numerologies for multiple scenarios where different SCS values may be allowable.

In accordance with some exemplary embodiments, there may be two schemes to indicate a SCS numerology for a SSB of a NR carrier for a NR NSA scenario. In Scheme I, a new LTE SIB 2N information element may be designed as below by defining a field comprising a bit (which is denoted by "ENUMERATED" in a "subcarrierSpacing" field, as shown in the box) for each neighboring NR carrier to indicate the SCS numerology for the SSB of the corresponding neighboring NR carrier. The SIB 2N information element is a new SIB defined in LTE which may contain inter-RAT cell reselection information about NR frequencies and NR neighbor cells.

SystemInformationBlockType2N Information Element

```
-- ASN1START
SystemInformationBlockType2N-r15 ::=  SEQUENCE {
   carrierFreqListNR               CarrierFreqListNR-r15       OPTIONAL,
   --
Need OR
   lateNonCriticalExtension            OCTET STRING ( )       OPTIONAL,
   ...
}
CarrierFreqListNR-r15 ::=               SEQUENCE (SIZE (1..maxNR-Carrier-r15)) OF
CarrierFreqNR-r15
CarrierFreqNR-r15 ::=                      SEQUENCE {
   -- FFS which EUTRA functions to support like reduced measurement performance,
MFBI, ..
   carrierFreq                                     ARFCN-ValueUTRA,
   subcarrierSpacing                  ENUMERATED (0, 1)
```

-continued

```
  allowedMeasBandwidth              AllowedMeasBandwidth,
  presenceAntennaPort1              PresenceAntennaPort1,
  neighCellConfig                   NeighCellConfig,
  cellReselectionPriority           CellReselectionPriority    OPTIONAL,    --
Need OP
  q-OffsetFreq                      Q-OffsetRange    DEFAULT dB0,
  q-RxLevMin                        INTEGER (-60..-13),
  p-MaxNR                           INTEGER (-50..33),
  q-QualMin-r9                      Q-QualMin-r9    OPTIONAL,    --
Need OP
  threshX-High                      ReselectionThreshold,
  threshX-Low                       ReselectionThreshold,
  threshX-Q-r9             SEQUENCE {
       threshX-HighQ-r9             ReselectionThresholdQ-r9,
       threshX-LowQ-r9              ReselectionThresholdQ-r9
    }                                           OPTIONAL    --
Cond RSRQ
  t-ReselectionNR                   T-Reselection,
  t-ReselectionSF-NR                SpeedStateScaleFactors    OPTIONAL,    --
Need OP
  interFreqNeighCellList            InterFreqNeighCellList    OPTIONAL,    --
Need OR
  interFreqBlackCellList            InterFreqBlackCellList    OPTIONAL,    --
Need OR
  ...,
}
-- ASN1STOP
```

In Scheme II, a new MeasObjectNR information element in a RRC connection reconfiguration message may be designed as below by defining a field comprising a bit (which is denoted by "ENUMERATED" in a "subcarrier-Spacing" field, as shown in the box) for a specific NR carrier. As such, when a LTE eNB would like a UE to measure a specific NR frequency, the MeasObjectNR information element may be used to indicate the SCS numerology for the SSB of the corresponding NR carrier. The MeasObjectNR information element may specify information applicable for inter-RAT NR neighboring cells.

MeasObjectNR Information Element

```
-- ASN1START
MeasObjectNR ::=                  SEQUENCE {
  carrierFreq                         ARFCN-ValueNR,
  subcarrierSpacing               ENUMERATED (0, 1)
  offsetFreq                        Q-OffsetRangeInterRAT DEFAULT 0,
  cellsToRemoveList                 CellIndexList OPTIONAL,    --
Need ON
  cellsToAddModList               CellsToAddModListNR,
  cellForWhichToReportCGI           PhysCellIdNR OPTIONAL,    --
Need ON
  -- TBC whether no other (inter-RAT/ EUTRA) functionality is be supported for NR
cells
  ...
}
CellsToAddModListNR ::=    SEQUENCE (SIZE (1..maxCellMeas)) OF CellsToAddModNR
CellsToAddModNR ::=    SEQUENCE {
  cellIndex                       INTEGER (1..maxCellMeas),
  physCellId                        PhysCellIdNR
}
CSG-AllowedReportingCells-r9 ::=    SEQUENCE {
  physCellIdRangeUTRA-FDDList-r9 PhysCellIdRangeUTRA-FDDList-r9    OPTIONAL --
Need OR
}
-- ASN1STOP
```

In accordance with some exemplary embodiments, the subCarrierSpacing field as defined in Scheme I or Scheme II may comprise 1 bit to provide information related to the SCS numerology for the SSB of the specific frequency. For example, setting the bit as "0" may indicate that the 15 kHz SCS is used for the SSB in band below 6 GHz and the 120 kHz SCS is used for the SSB in band above 6 GHz. Correspondingly, setting the bit as "1" may indicate that the 30 kHz SCS is used for the SSB in band below 6 GHz and the 240 kHz SCS is used for the SSB in band above 6 GHz. If there is no signaling broadcasted, the default SCS may be used. It will be appreciated that this bit also may be set as other values which are suitable for indicating the SCS numerology for the SSB of the specific frequency.

Thus it can be seen that for the NSA scenario, a UE can know the SCS numerology of a NR frequency according to Scheme I, even this UE has not been connected to a LTE eNB, for example, when the UE is in idle mode. On the other hand, according to Scheme II, a UE can know the SCS numerology of a NR frequency when this UE is connected to a LTE eNB, for example, in the case that the UE is in a connected mode.

For the NR SA scenario, an approach similar to Scheme II can be used to indicate a SCS numerology for a SSB of a frequency/band by a gNB for a RRC connected UE. For example, a subcarrierSpacing field as described in Scheme II may be added in a MeasObjectNR information element in the NR SA scenario to indicate the SCS numerology of the SSB of the frequency which the gNB wants the UE to measure.

It will be realized that parameters, variables and settings related to the SCS numerology described herein are just examples. Other suitable parameter settings, the associated configuration parameters and the specific values thereof may also be applicable to implement the proposed methods.

The proposed solution according to one or more exemplary embodiments may enable the SCS information for a specific frequency band to be indicated to a terminal device by a network node, so that the terminal device may know the SCS numerology for the SS transmission on the specific frequency band, and thus can perform SS detection more efficiently. For example, a UE may be able to detect a NR cell via a single SCS per band, thereby avoiding blind SCS detection and reducing the UE complexity, the power consumption, and the time required to access a NR cell. Besides, the proposed solution may provide the possibility to adapt a proper SCS numerology for a specific scenario. For example, the network may be able to flexibly adapt different SCS numerologies for various scenarios.

The various blocks shown in FIGS. 3-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
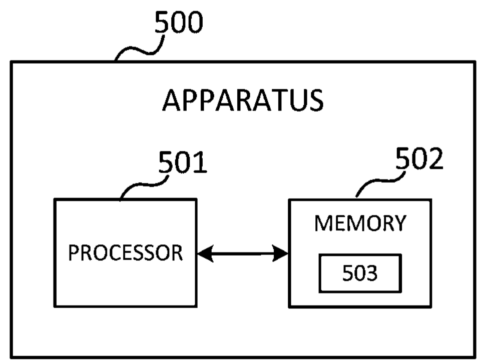
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In some implementations, the one or more memories 502 and the computer program codes 503 may be configured to, with the one or more processors 501, cause the apparatus 500 at least to perform any operation of the method as described in connection with FIG. 3. In other implementations, the one or more memories 502 and the computer program codes 503 may be configured to, with the one or more processors 501, cause the apparatus 500 at least to perform any operation of the method as described in connection with FIG. 4.

Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6:
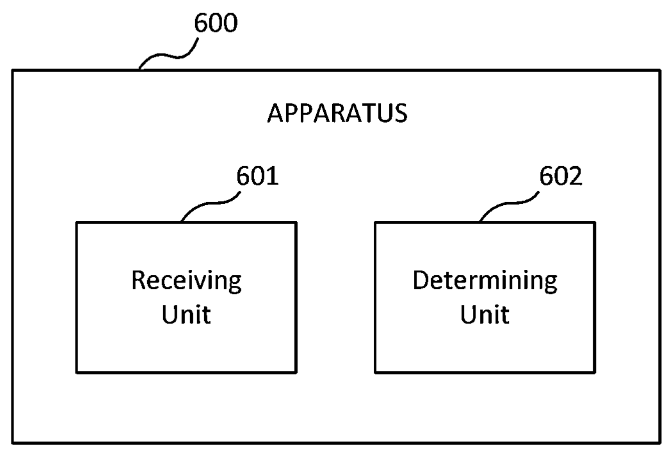
FIG. 6 is a block diagram illustrating another apparatus according to some embodiments of the present disclosure.

FIG. 6 is a block diagram illustrating an apparatus 600 according to some embodiments of the present disclosure. As shown in FIG. 6, the apparatus 600 may comprise a receiving unit 601 and a determining unit 602. In an exemplary embodiment, the apparatus 600 may be implemented at a terminal device such as a UE. The receiving unit 601 may be operable to carry out the operation in block 302, and the determining unit 602 may be operable to carry out the operation in block 304. Optionally, the receiving unit 601 and/or the determining unit 602 may be operable to carry out more or less operations to implement the proposed methods according to the exemplary embodiments of the present disclosure.

Figure 7:
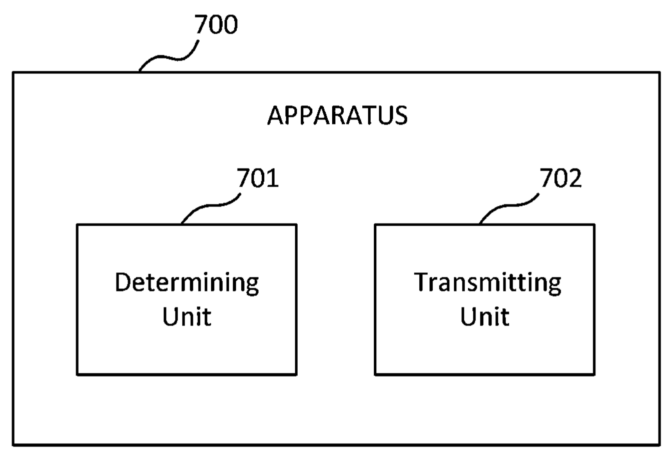
FIG. 7 is a block diagram illustrating yet another apparatus according to some embodiments of the present disclosure.

FIG. 7 is a block diagram illustrating an apparatus 700 according to some embodiments of the present disclosure. As shown in FIG. 7, the apparatus 700 may comprise a determining unit 701 and a transmitting unit 702. In an exemplary embodiment, the apparatus 700 may be implemented at a network node such as a base station. The determining unit 701 may be operable to carry out the operation in block 402, and the transmitting unit 702 may be operable to carry out the operation in block 404. Optionally, the determining unit 701 and/or the transmitting unit 702 may be operable to carry out more or less operations to implement the proposed methods according to the exemplary embodiments of the present disclosure.

Figure 8:
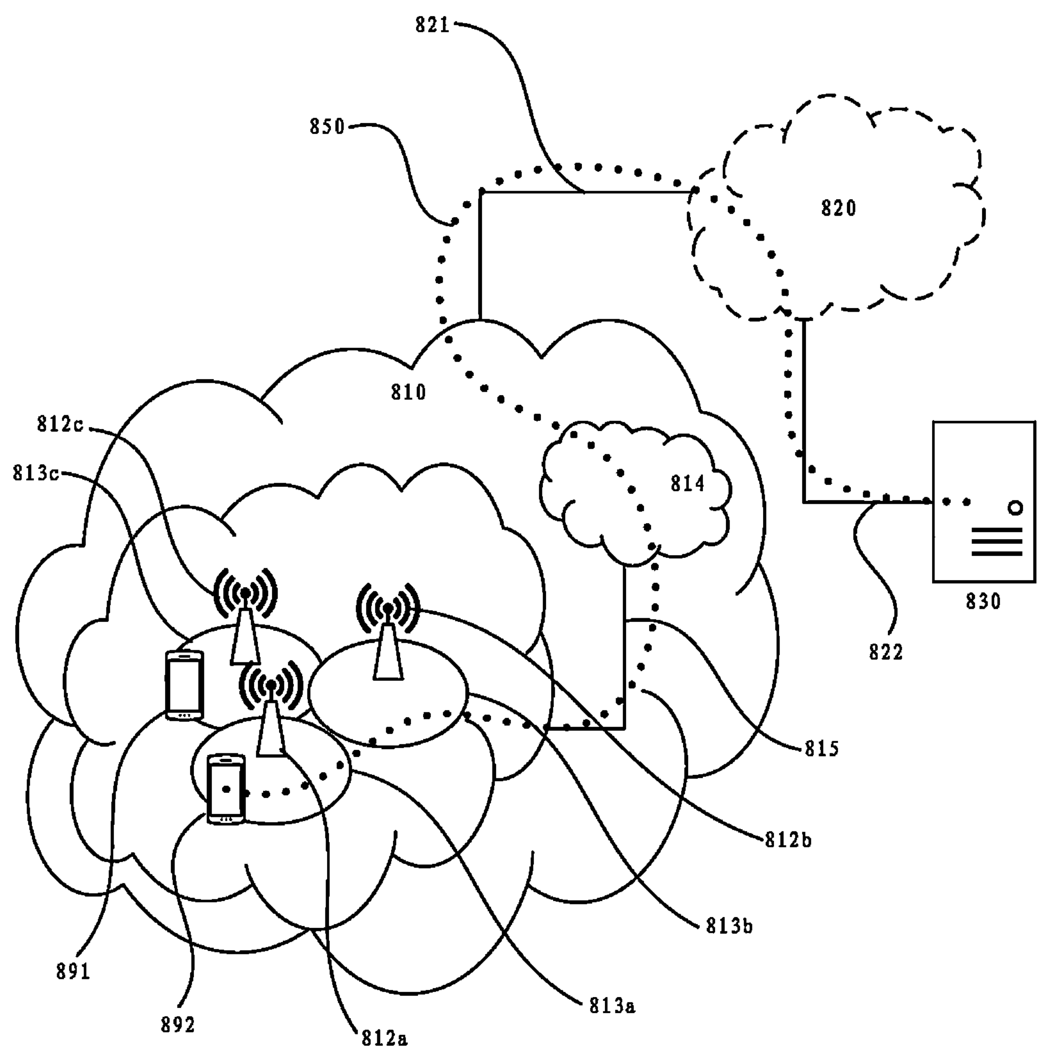
FIG. 8 is a block diagram illustrating a telecommunication network connected via an intermediate network to a host computer in accordance with some embodiments of the present disclosure.

FIG. 8 is a block diagram illustrating a telecommunication network connected via an intermediate network to a host computer in accordance with some embodiments of the present disclosure.

With reference to FIG. 8, in accordance with an embodiment, a communication system includes a telecommunication network 810, such as a 3GPP-type cellular network, which comprises an access network 811, such as a radio access network, and a core network 814. The access network 811 comprises a plurality of base stations 812*a*, 812*b*, 812*c*, such as NB s, eNBs, gNBs or other types of wireless access points, each defining a corresponding coverage area 813*a*, 813*b*, 813*c*. Each base station 812*a*, 812*b*, 812*c* is connectable to the core network 814 over a wired or wireless connection 815. A first UE 891 located in a coverage area 813*c* is configured to wirelessly connect to, or be paged by, the corresponding base station 812*c*. A second UE 892 in a coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. A host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Figure 9:
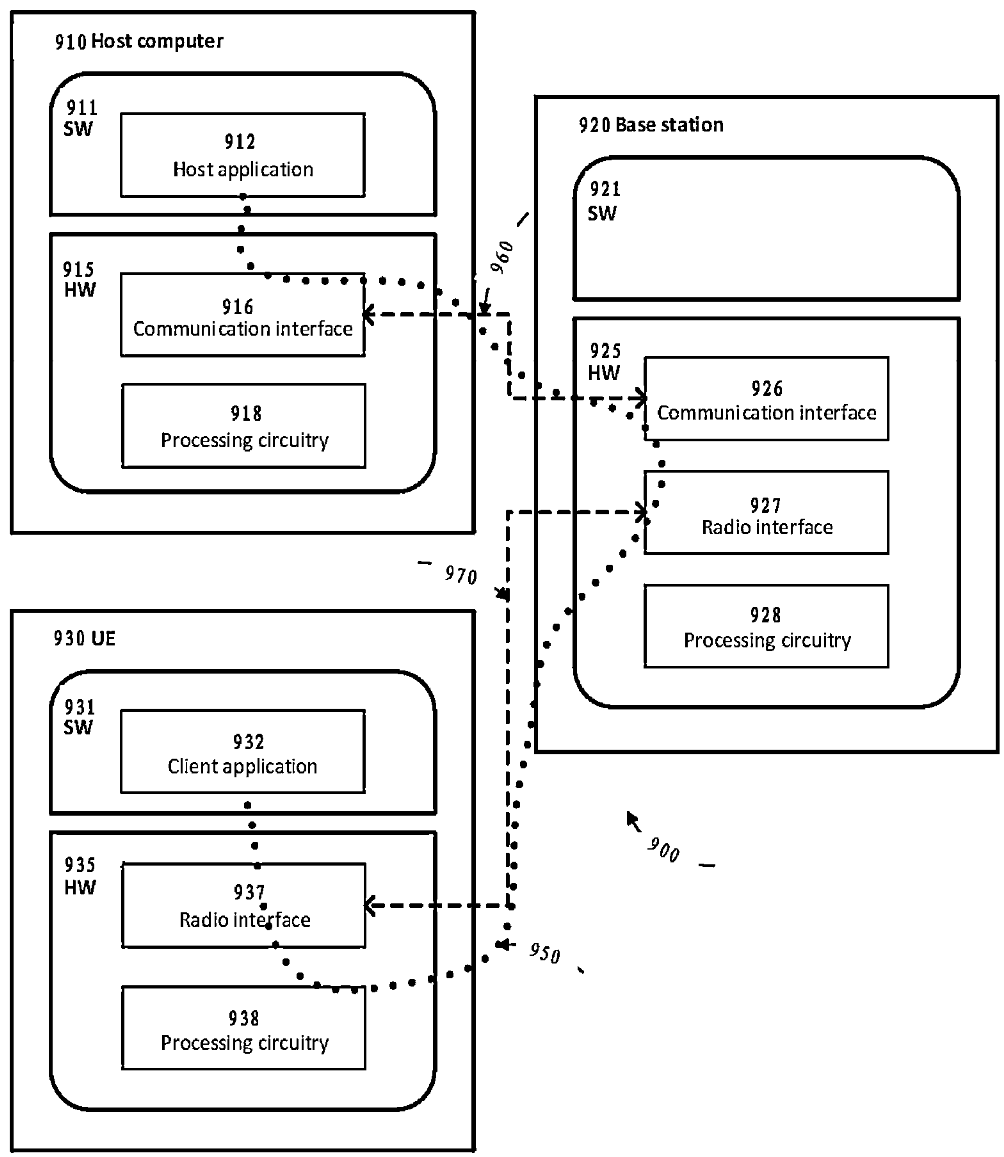
FIG. 9 is a block diagram illustrating a host computer communicating via a base station with a UE over a partially wireless connection in accordance with some embodiments of the present disclosure.

FIG. 9 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

It is noted that the host computer 910, the base station 920 and the UE 930 illustrated in FIG. 9 may be similar or identical to the host computer 830, one of base stations 812*a*, 812*b*, 812*c* and one of UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

Figure 10:
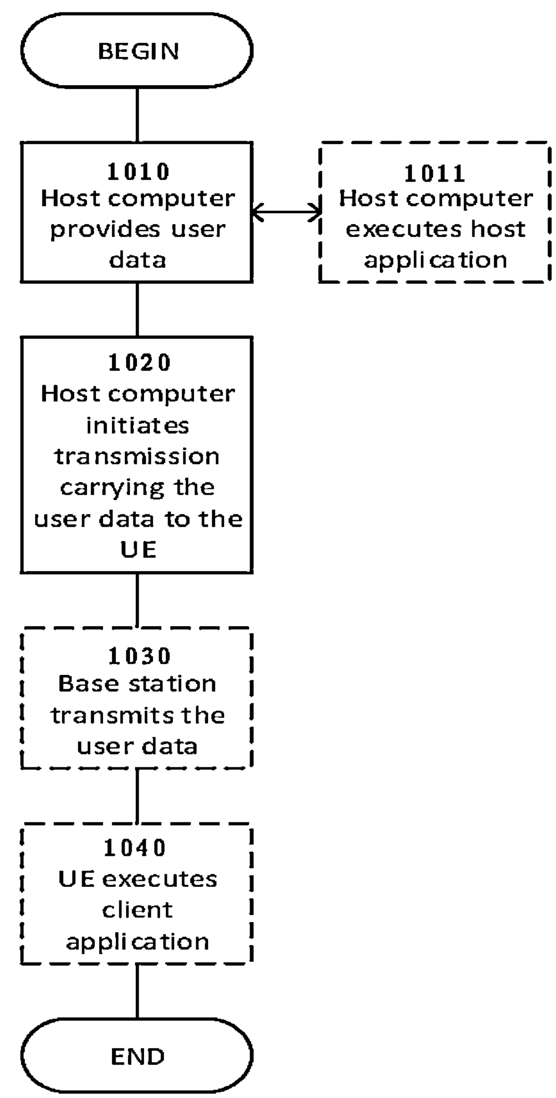
FIG. 10 is a flowchart illustrating a method implemented in a communication system, in accordance with an embodiment.

FIG. 10 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
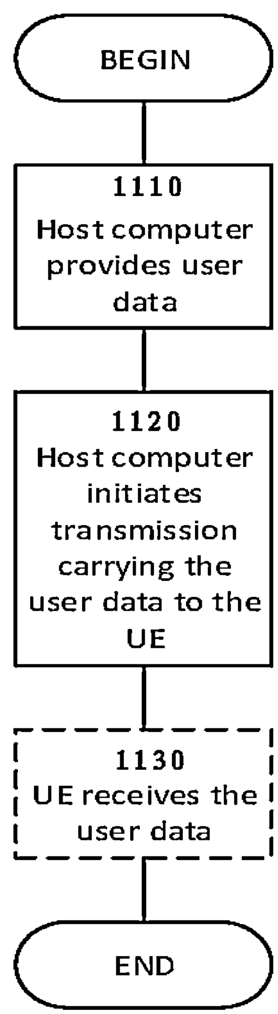
FIG. 11 is a flowchart illustrating a method implemented in a communication system, in accordance with an embodiment.

FIG. 11 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
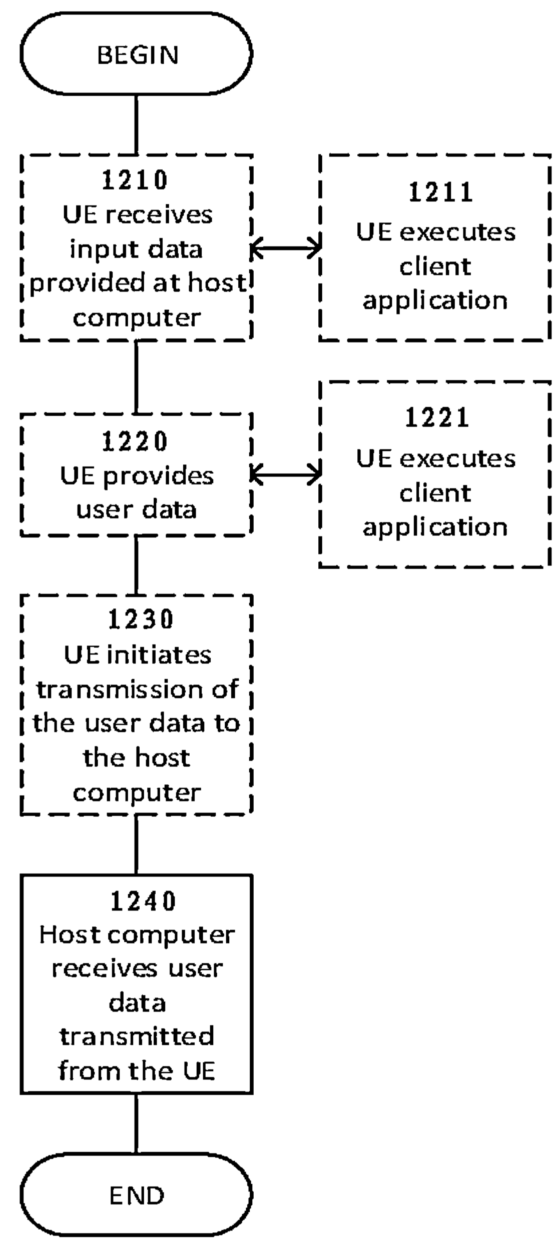
FIG. 12 is a flowchart illustrating a method implemented in a communication system, in accordance with an embodiment.

FIG. 12 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
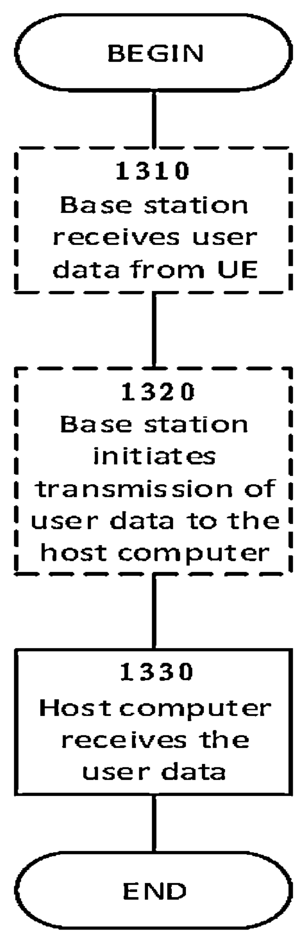
FIG. 13 is a flowchart illustrating a method implemented in a communication system, in accordance with an embodiment.

FIG. 13 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a terminal device, comprising:

receiving a signaling message from a network node, wherein the signaling message is a radio resource control connection reconfiguration message, and wherein the signaling message comprises measurement object information that indicates a subcarrier spacing numerology for a synchronization signal transmission of a frequency;

determining the subcarrier spacing numerology, based at least in part on the measurement object information; and detecting the synchronization signal transmission according to the determined subcarrier spacing numerology.

2. The method according to claim 1, wherein the measurement object information indicates a subcarrier spacing numerology for a synchronization signal transmission of a frequency for inter-radio access technologies new radio (NR) neighboring cells.

3. The method according to claim 1, wherein the measurement object information indicates a subcarrier spacing numerology for a synchronization signal transmission of a frequency which the network node wants the terminal device to measure.

4. The method according to claim 1, wherein the signaling message comprises a dedicated signaling message for the terminal device, and wherein the measurement object information is associated with frequency measurement.

5. An apparatus to be implemented in a terminal device or communicatively coupled to a terminal device, the apparatus comprising:

one or more processors; and one or more memories comprising computer program codes, the one or more memories and the computer program codes configured to, with the one or more processors, cause the apparatus at least to:

receive a signaling message from a network node, wherein the signaling message is a radio resource control connection reconfiguration message, and wherein the signaling message comprises measurement object information that indicates a subcarrier spacing numerology for a synchronization signal transmission of a frequency;

determine the subcarrier spacing numerology, based at least in part on the measurement object information; and detect the synchronization signal transmission according to the determined subcarrier spacing numerology.

6. The apparatus according to claim 5, wherein the measurement object information indicates a subcarrier spacing numerology for a synchronization signal transmission of a frequency for inter-radio access technologies new radio (NR) neighboring cells.

7. The apparatus according to claim 5, wherein the measurement object information indicates a subcarrier spacing numerology for a synchronization signal transmission of a frequency which the network node wants the terminal device to measure.

8. The apparatus according to claim 5, wherein the signaling message comprises a dedicated signaling message for the terminal device, and wherein the measurement object information is associated with frequency measurement.

9. A method implemented at a network node, the method comprising:

determining a signaling message, wherein the signaling message is a radio resource control connection reconfiguration message which comprises measurement object information that indicates a subcarrier spacing numerology for a synchronization signal transmission of a frequency; and transmitting the signaling message to a terminal device.

10. The method according to claim 9, wherein the measurement object information indicates a subcarrier spacing numerology for a synchronization signal transmission of a frequency for inter-radio access technologies new radio (NR) neighboring cells.

11. The method according to claim 9, wherein the measurement object information indicates a subcarrier spacing numerology for a synchronization signal transmission of a frequency which the network node wants the terminal device to measure in the NR Stand-Alone (SA) scenario.

12. The method according to claim 9, wherein the subcarrier spacing numerology is adaptive to a network configuration related to the terminal device.

13. An apparatus to be implemented in a network node or communicatively coupled to a network node, the apparatus comprising:

one or more processors; and one or more memories comprising computer program codes, the one or more memories and the computer program codes configured to, with the one or more processors, cause the apparatus at least to:

determine a signaling message, wherein the signaling message is a radio resource control connection reconfiguration message which comprises measurement object information that indicates a subcarrier spacing numerology for a synchronization signal transmission of a frequency band for inter-radio access technologies new radio (NR) neighboring cells; and transmit the signaling message to a terminal device.

14. The apparatus according to claim 13, wherein the measurement object information indicates a subcarrier spacing numerology for a synchronization signal transmission of a frequency for inter-radio access technologies new radio (NR) neighboring cells.

15. The apparatus according to claim 13, wherein the measurement object information indicates a subcarrier spacing numerology for a synchronization signal transmission of a frequency which the network node wants the terminal device to measure in the NR Stand-Alone (SA) scenario.

16. The apparatus according to claim 13, wherein the subcarrier spacing numerology is adaptive to a network configuration related to the terminal device.

* * * * *